(12) United States Patent
Frenkel

(10) Patent No.: US 11,706,194 B2
(45) Date of Patent: *Jul. 18, 2023

(54) AUTOMATIC SECURITY RESPONSE USING ONE-WAY LINKS

(71) Applicant: WATERFALL SECURITY SOLUTIONS LTD., Rosh HaAyin (IL)

(72) Inventor: Lior Frenkel, Misgav Dov (IL)

(73) Assignee: WATERFALL SECURITY SOLUTIONS LTD., Rosh HaAyin (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/494,857

(22) Filed: Oct. 6, 2021

(65) Prior Publication Data

US 2022/0029959 A1 Jan. 27, 2022

Related U.S. Application Data

(63) Continuation of application No. 16/535,113, filed on Aug. 8, 2019, now Pat. No. 11,190,486.

(60) Provisional application No. 62/717,947, filed on Aug. 13, 2018.

(51) Int. Cl.
*H04L 9/40* (2022.01)

(52) U.S. Cl.
CPC ........ *H04L 63/0209* (2013.01); *H04L 63/145* (2013.01); *H04L 63/1416* (2013.01)

(58) Field of Classification Search
CPC ... H04L 63/0209; H04L 63/141; H04L 63/06; H04L 63/145; H04L 63/1441; H04L 63/18; H04L 63/02; H04L 63/14
See application file for complete search history.

(56) References Cited

U.S. PATENT DOCUMENTS

| 9,608,973 B2* | 3/2017 | Lee ........................ H04L 63/08 |
| 2009/0002150 A1* | 1/2009 | Zilberstein ......... G05B 23/0208 340/531 |
| 2012/0215911 A1* | 8/2012 | Raleigh ................ H04M 15/66 709/224 |
| 2017/0054687 A1* | 2/2017 | Ishigaki ............. H04L 63/0281 |
| 2018/0262475 A1* | 9/2018 | Vaisband ............ H04L 63/0478 |
| 2019/0014081 A1* | 1/2019 | Kim ...................... H04L 63/101 |
| 2020/0120071 A1* | 4/2020 | Wimmer ............... H04L 63/164 |

* cited by examiner

*Primary Examiner* — Ali S Abyaneh
(74) *Attorney, Agent, or Firm* — Kligler & Associates Patent Attorneys Ltd

(57) ABSTRACT

In one embodiment, a secure network system includes a two-way bridge connecting a protected packet data network with an external packet data network so as to allow bidirectional communication between the protected and external networks, a one-way link unidirectionally connecting the protected network to the external network and physically configured to carry signals in one direction from the protected network to the external network and to be incapable of carrying signals in the opposite direction from the external packet data network to the protected packet data network, and a security server to receive an indication of a security threat to at least one of the networks, and in response to the indication, to deactivate the two-way bridge and activate the one-way link so as to prevent the protected network from receiving packets from the external network while allowing forwarding of packets from the protected network to the external network.

10 Claims, 8 Drawing Sheets

AUTOMATIC SECURITY RESPONSE USING ONE-WAY LINKS

RELATED APPLICATION INFORMATION

The present application is a Continuation Application of U.S. patent application Ser. No. 16/535,113 of Frenkel, filed on Aug. 8, 2019, which claims benefit of U.S. Provisional Patent Application Ser. No. 62/717,947 of Frenkel, filed on Aug. 13, 2018, the disclosures of which are hereby incorporated herein by reference.

FIELD OF THE INVENTION

The present invention relates to network security, and in particular, but not exclusively, securing networks using one-way links.

BACKGROUND

In a computer network handling physical processes or sensitive data, portions of the network may be connected by hardware-enforced unidirectional channels (also referred to as one-way links). The terms "hardware-enforced unidirectional channel" and "one-way link" are used in the context of the present patent application and in the claims to refer to a communication link that is physically configured to carry signals in one direction and to be incapable of carrying signals in the opposite direction. Hardware-enforced unidirectional channels may be implemented, for example, using Waterfall® systems, which are manufactured by Waterfall Security Solutions, Ltd. (Rosh HaAyin, Israel). The Waterfall system provides a physical one-way connection based on fiberoptic communication, using an underlying proprietary transfer protocol. When a transmitting computer is connected by a Waterfall system (or other hardware-enforced unidirectional channel) to a receiving computer, the receiving computer can receive data from the transmitting computer but has no physical means of sending any return communications to the transmitting computer.

Hardware-enforced unidirectional channels may be used to prevent data either from entering or leaving a protected facility. For example, confidential data that must not be accessed from external sites may be stored on a computer that is configured to receive data over a hardware-enforced unidirectional channel and has no physical outgoing link over which data might be transmitted to an external site. On the other hand, in some applications, the operator of the protected facility may be prepared to allow data to exit the facility freely via a hardware-enforced unidirectional channel, while preventing data from entering the facility in order to thwart hackers and cyber-terrorists.

In this latter category, for example, U.S. Pat. No. 7,649,452, whose disclosure is incorporated herein by reference, describes protection of control networks using a one-way link. As described in this patent, a method for monitoring a process includes receiving a signal from a sensor that is indicative of a physical attribute associated with the process and transmitting data indicative of the received signal over a one-way link. The transmitted data received from the one-way link are used in monitoring the process. The method is described in the patent particularly in the context of Supervisory Control And Data Acquisition (SCADA) systems. A SCADA system receives monitoring data from the monitored facility via a one-way link. The SCADA system is unable to transmit any sort of data back to the monitored facility (although a separate, open-loop connection may be provided for this purpose), and therefore cannot be used as the base for an attack on the facility.

SUMMARY

There is provided in accordance with an embodiment of the present disclosure, a secure network system including a two-way bridge connecting a protected packet data network with an external packet data network so as to allow bidirectional communication between the protected and external packet data networks, a one-way link unidirectionally connecting the protected packet data network to the external packet data network and physically configured to carry signals in one direction from the protected packet data network to the external packet data network and to be incapable of carrying signals in the opposite direction from the external packet data network to the protected packet data network, and a security server configured to receive an indication of a security threat to at least one of the packet data networks, and in response to the indication, to deactivate the two-way bridge and activate the one-way link so as to prevent the protected packet data network from receiving packets from the external packet data network while allowing forwarding of packets from the protected packet data network to the external packet data network.

Further in accordance with an embodiment of the present disclosure the one-way link includes a hardware-enforced unidirectional channel.

Still further in accordance with an embodiment of the present disclosure the one-way link is a first one way link, the two-way bridge is a first two way-bridge, the external packet data network includes a first subnetwork and a second subnetwork, the first two-way bridge bidirectionally connects the protected packet data network with the first subnetwork, the first one-way link unidirectionally connects the protected packet data network to the first subnetwork, the system further including a second two-way bridge connecting the first subnetwork with the second subnetwork of the external packet data network, so as to allow bidirectional communication between the first and second subnetworks, and a second one-way link unidirectionally connecting the first subnetwork to the second subnetwork, and configured to carry signals in one direction from the first subnetwork to the second subnetwork and to be incapable of carrying signals in the opposite direction from the second subnetwork to the first subnetwork, wherein the security server is configured to deactivate the second two-way bridge responsively to receiving the indication of the security threat, and activate the second one-way link so as to prevent the first subnetwork from receiving packets from the second subnetwork while allowing forwarding of packets from the protected packet data network and the first subnetwork to the second subnetwork.

Additionally, in accordance with an embodiment of the present disclosure the security server is disposed in the second subnetwork.

Moreover in accordance with an embodiment of the present disclosure, the system includes a network device disposed in the protected packet data network, and configured to receive data packets from a first host disposed in the protected packet data network for forwarding to a second host disposed in the external packet data network, and mirror the received packets towards the two-way bridge and the one-way link.

Further in accordance with an embodiment of the present disclosure the one-way link is configured to discard first ones of the mirrored packets while the two-way bridge is active, the security server being configured to issue a command in response to receiving the indication of the security threat, the one-way link being configured to forward second ones of the mirrored packets to the second host responsively to receiving the issued command from the security server.

Still further in accordance with an embodiment of the present disclosure the one-way link includes a transmit-end and a receive-end, the transmit-end being configured to discard the first ones of the mirrored packets while the two-way bridge is active, and to forward the second ones of the mirrored packets to the second host responsively to receiving the issued command from the security server.

Additionally in accordance with an embodiment of the present disclosure the one-way link includes a transmit-end and a receive-end, the receive-end being configured to discard the first ones of the mirrored packets while the two-way bridge is active, and forward the second ones of the mirrored packets to the second host responsively to receiving the issued command from the security server.

Moreover in accordance with an embodiment of the present disclosure the security server is configured to issue a command in response to receiving the indication of the security threat, the system further including a network device disposed in the protected packet data network, and configured to receive data packets from a first host disposed in the protected packet data network for forwarding to a second host disposed in the external packet data network, forward the received packets towards the two-way bridge while the two-way bridge is active, and forward the received packets towards the one-way link responsively to receiving the issued command from the security server.

Further in accordance with an embodiment of the present disclosure the one-way link includes a transmit-end and a receive-end, the one-way link including a proxy at both the transmit-end and the receive-end emulating hosts in the protected and external packet networks, and adopting Internet Protocol (IP) addresses of the hosts so as to allow the hosts in the protected and external packet networks to use the IP addresses in network communications over the one-way-link.

Still further in accordance with an embodiment of the present disclosure the IP addresses of the hosts disposed in the protected packet data network and the external packet data network include a same network identification.

There is also provided in accordance with another embodiment of the present disclosure, a secure network method, including connecting a protected packet data network with an external packet data network using a two-way bridge so as to allow bidirectional communication between the protected and external packet data networks, unidirectionally connecting the protected packet data network to the external packet data network using a one-way link which is physically configured to carry signals in one direction from the protected packet data network to the external packet data network and to be incapable of carrying signals in the opposite direction from the external packet data network to the protected packet data network, receiving an indication of a security threat to at least one of the packet data networks, and in response to the indication, deactivating the two-way bridge and activating the one-way link so as to prevent the protected packet data network from receiving packets from the external packet data network while allowing forwarding of packets from the protected packet data network to the external packet data network.

Additionally, in accordance with an embodiment of the present disclosure the one-way link includes a hardware-enforced unidirectional channel.

Moreover in accordance with an embodiment of the present disclosure the one-way link is a first one way link, the two-way bridge is a first two way-bridge, the external packet data network includes a first subnetwork and a second subnetwork, the method further including bidirectionally connecting the protected packet data network with the first subnetwork using the first two-way bridge, unidirectionally connecting the protected packet data network to the first subnetwork using the first one-way bridge, connecting the first subnetwork with the second subnetwork of the external packet data network using a second two-way bridge, so as to allow bidirectional communication between the first and second subnetworks, unidirectionally connecting the first subnetwork to the second subnetwork using a second one-way link configured to carry signals in one direction from the first subnetwork to the second subnetwork and to be incapable of carrying signals in the opposite direction from the second subnetwork to the first subnetwork, deactivating the second two-way bridge responsively to receiving the indication of the security threat, and activating the second one-way link so as to prevent the first subnetwork from receiving packets from the second subnetwork while allowing forwarding of packets from the protected packet data network and the first subnetwork to the second subnetwork.

Further in accordance with an embodiment of the present disclosure, the method includes receiving data packets, by a network device disposed in the protected packet data network, from a first host disposed in the protected packet data network for forwarding to a second host disposed in the external packet data network, and mirroring, by the network device, the received packets towards the two-way bridge and the one-way link.

Still further in accordance with an embodiment of the present disclosure, the method includes discarding first ones of the mirrored packets by the one-way link while the two-way bridge is active, issuing a command in response to receiving the indication of the security threat, and forwarding second ones of the mirrored packets by the one-way link to the second host responsively to receiving the issued command.

Additionally, in accordance with an embodiment of the present disclosure, the method includes discarding the first ones of the mirrored packets by a transmit-end of the one-way link while the two-way bridge is active, and forwarding the second ones of the mirrored packets to the second host responsively to receiving the issued command.

Moreover, in accordance with an embodiment of the present disclosure, the method includes discarding the first ones of the mirrored packets by a receive-end of the one-way link while the two-way bridge is active, and forwarding the second ones of the mirrored packets to the second host responsively to receiving the issued command.

Further in accordance with an embodiment of the present disclosure, the method includes issuing a command in response to receiving the indication of the security threat, receiving data packets, by a network device disposed in the protected packet data network, from a first host disposed in the protected packet data network for forwarding to a second host disposed in the external packet data network, forwarding the received packets, by the network device, towards the two-way bridge while the two-way bridge is active, forwarding the received packets, by the network device, towards the one-way link responsively to receiving the issued command.

Still further in accordance with an embodiment of the present disclosure, the method includes emulating, at both a transmit-end and a receive-end of the one-way link, hosts in the protected and external packet networks, and adopting Internet Protocol (IP) addresses of the hosts so as to allow the hosts in the protected and external packet networks to use the TP addresses in network communications over the one-way-link.

Additionally, in accordance with an embodiment of the present disclosure the IP addresses of the hosts disposed in the protected packet data network and the external packet data network include a same network identification.

BRIEF DESCRIPTION OF THE DRAWINGS

The present invention will be understood from the following detailed description, taken in conjunction with the drawings in which.

DESCRIPTION OF EXAMPLE EMBODIMENTS

Overview

Figure 1:
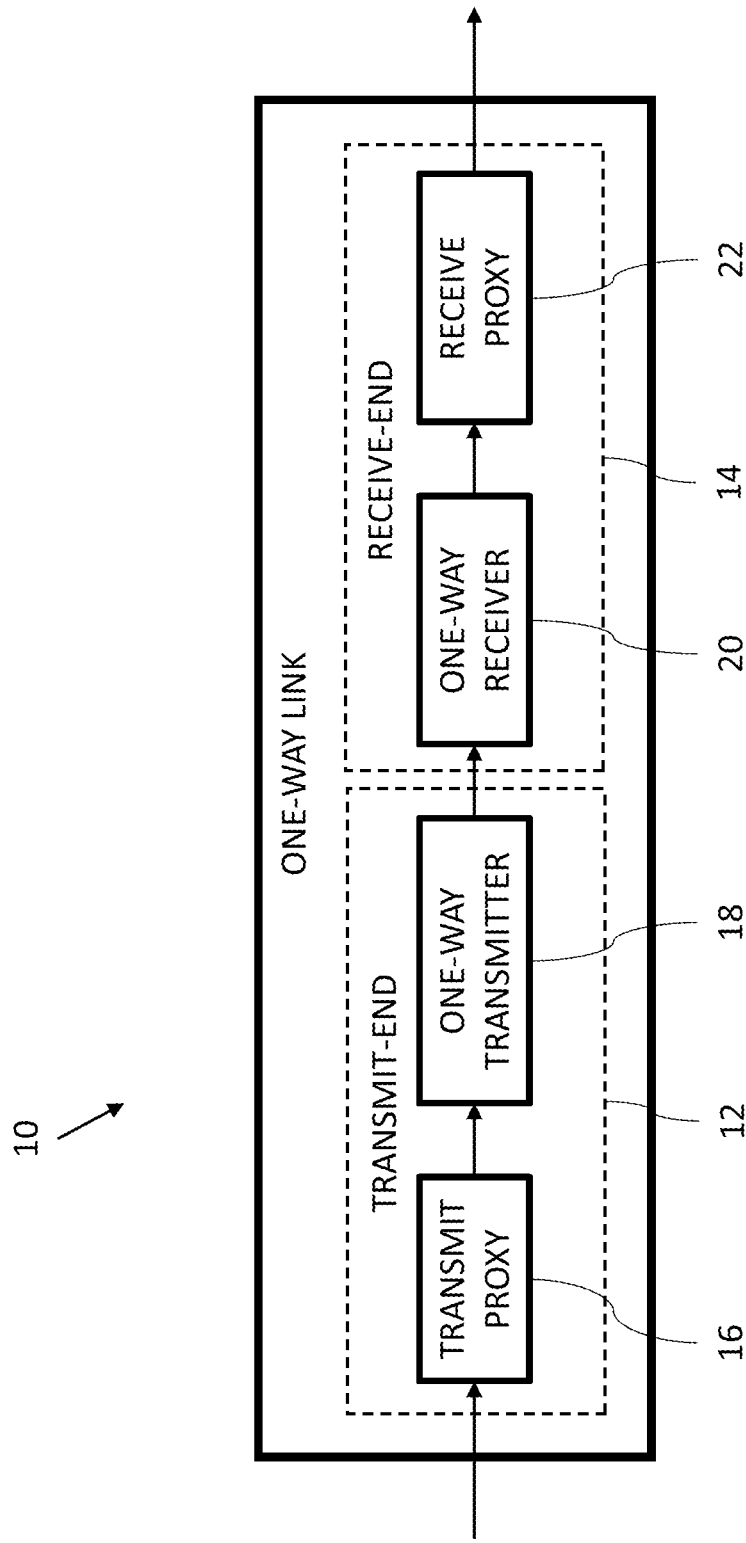
FIG. 1 is a block diagram view of a one-way link constructed and operative in accordance with embodiments of the present invention.

Embodiments of the present invention provide an improved solution, which enhances network security while maintaining data throughput in many scenarios, based on selective used of at least one two-way bridge (e.g., bidirectional path) and at least one one-way link. The one-way link(s) may be configured as hardware-enforced unidirectional channels, as defined above. Under normal operating conditions (e.g., in the absence of a security threat), communication traffic is carried between different segments of the network by the two-way bridge(s). When a threat is detected in one or more network segments, however, the two-way bridge(s) serving these segments is/are deactivated, and traffic is conveyed instead through the parallel one-way link(s). The one-way link(s) may be arranged in such a way as to enable critical network functions, such as remote monitoring or control of a physical process, to continue, while blocking propagation of malicious traffic between segments of the network.

Embodiments of the present invention are now described briefly with respect to two segments of a network, a protected packet data network and an external packet data network. The protected packet data network, may be a distributed control system (DCS) network including a DCS, which controls a generating unit of a power-plant consisting of a coal furnace, boiler, steam turbine and generator, by way of example only. The DCS may host equipment that directly monitors and controls the physical generating process, including human-machine interface workstations, alarm servers and programmable logic controllers, by way of example only. The external packet data network may include computers and other network-connected equipment coordinating activities at the plant, such as a maintenance management systems and process historian servers, by way of example only. In some embodiments, the external network may be subdivided into subnetworks, for example, an IT subnetwork and a plant-wide subnetwork, which are connected using respective two-way bridges and one-way links, as described in more detail with reference to FIGS. 6-8.

A two-way bridge connects the protected packet data network with the external packet data network so as to allow bidirectional communication between the protected and external packet data networks. A one-way link unidirectionally connects the protected packet data network to the external packet data network, and is physically configured to carry signals in one direction from the protected packet data network to the external packet data network and to be incapable of carrying signals in the opposite direction from the external packet data network to the protected packet data network.

A security server, such as a Security Information and Event Management (SIEM) computer system, typically disposed in the external packet data network, receives an indication (or indications) of a security threat to at least one of the packet data networks, for example, from a sensor in at least one of the packet data networks, or from a manual trigger, which may be external to the packet data networks. In response to the indication(s), the security server deactivates the two-way bridge and activates the one-way link so as to prevent the protected packet data network from receiving packets from the external packet data network while allowing forwarding of packets from the protected packet data network to the external packet data network. The deactivation of the two-way bridge, and the activation of the one-way link, may include the security server sending a command over the network and/or using an out-of-band connection or connections. The term "activate" as used in the specification and claims, in all grammatical forms, is defined to include actuating the one-way link to forward packets received from a first host towards a second host, and/or passing forwarding or routing instructions to one or more elements in one or more of the networks so that network traffic is routed through the one-way link. Disabling the two-way bridge may include a physical measure such as activation of a mechanical relay, which may require manual intervention to reactivate the two-way bridge at a future time when the security situation has normalized in order to ensure that the two-way bridge is not reactivated maliciously using a software attack. In some embodiments, the disablement of the two-way bridge may include an automatic timeout (e.g., 2 hours or any suitable time-period) so that if no new security alert is issued, the two-way bridge is automatically reactivated after expiration of the timeout.

In some embodiments, a network device disposed in the protected packet data network receives data packets from a first host disposed in the protected packet data network for forwarding to a second host disposed in the external packet data network. The network device mirrors the received packets towards the two-way bridge and the one-way link. When the two-way bridge is active, the received packets are forwarded to the second host via the two-way bridge, and the one-way link discards the mirrored packets. The mirrored packets may be discarded by a transmit-end or a receive-end of the one-way link. By way of a first example, the transmit-end may discard mirrored packets in the deactivated state of the one-way link so that the mirrored packets do not arrive at the receive-end. By way of a second example, the receive-end may discard mirrored packets that have been forwarded by the transmit-end in the deactivated state of the one-way link. In response to receiving the indication(s) of the security threat, the secure server issues a command, which leads to disabling of the two-way bridge and activation of the one-way link, which forwards the mirrored packets to the second host.

In some embodiments, the network device disposed in the protected packet data network receives data packets from a first host disposed in the protected packet data network for forwarding to a second host disposed in the external packet data network. The network device is configured via routing tables (for example) to forward the received packets towards the two-way bridge while the two-way bridge is active and configured via different routing tables (for example) to forward the received packets towards the one-way link responsively to receiving a command (e.g., new routing data) from the security server.

In some embodiments, the one-way link, once activated, includes a proxy at both the transmit-end and the receive-end emulating hosts in the protected and external packet networks, and adopting Internet Protocol (IP) addresses of the hosts so as to allow the hosts in the protected and external packet networks to use the IP addresses in network communications over the one-way-link.

In some embodiments, the IP addresses of the hosts disposed in the protected packet data network and the external packet data network may include a same network identification thereby simplifying communication between the networks. In some embodiments, the external network may be connected to more than one protected network via parallel two-way bridges and one-way links.

At a future time, when the security server determines that the security situation has normalized, the security server sends an "all clear" message to various network nodes and components, enabling them to return to normal operations. In some embodiments, that message would only reach the external packet-data network, because in the segmented network state, there is no way for the "all clear" message to reach the other networks. In these embodiments, human intervention may be required to press a button on the two-way bridge front panels, or using another suitable measure, enabling the two-way bridge(s) to resume normal operations.

System Description

Documents incorporated by reference herein are to be considered an integral part of the application except that, to the extent that any terms are defined in these incorporated documents in a manner that conflicts with definitions made explicitly or implicitly in the present specification, only the definitions in the present specification should be considered.

Reference is now made to FIG. 1, which is a block diagram view of a one-way link 10 constructed and operative in accordance with embodiments of the present invention. The one-way link 10 includes a hardware-enforced unidirectional channel, described below in more detail.

The one-way link 10 includes a transmit-end 12 and a receive-end 14. The transmit-end 12 includes a transmit proxy 16 and a one-way transmitter 18. The receive-end 14 includes a one-way receiver 20 and a receive proxy 22. The transmit proxy 16, typically implemented in software on a host processor, receives incoming communications and converts the communications into an appropriate data format for transmission by the one-way transmitter 18. The conversion may involve modifying the incoming communications, or extracting or deriving certain information from the incoming communications, discarding the incoming communications, and forwarding some or all of the transformed communications or extracted information to the one-way transmitter 18. The one-way transmitter 18 typically comprises a fiberoptic transmitter, which transmits the communications over a short fiberoptic cable to the one-way receiver 20. As the one-way link 10 comprises only the single one-way transmitter 18 at one end of the fiberoptic cable and the single one-way receiver 20 at the other end, the one-way link 10 is physically capable of carrying communications only in the single, designated direction for which it is configured. The receive proxy 22, also typically implemented in software, receives the data from the one-way receiver 20 and converts the data into the appropriate (typically standard) communication format for output. The transmit proxy 16 and the receive proxy 22 are described in more detail with reference to FIGS. 5 and 8.

Figure 2:
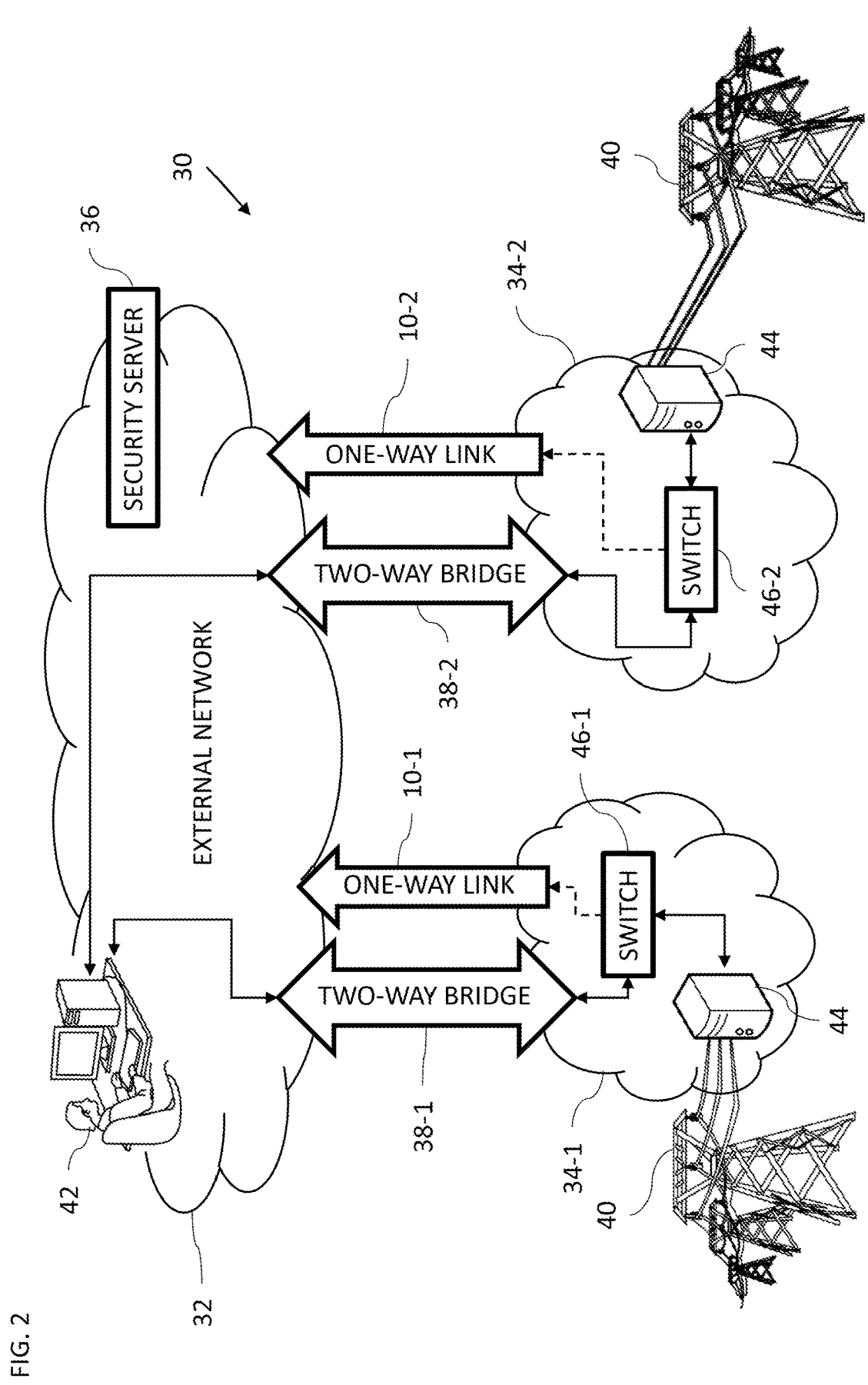
FIG. 2 is a schematic view of a secure network system constructed and operative in accordance with an embodiment of the present invention.

Reference is now made to FIG. 2, which is a schematic view of a secure network system 30 constructed and operative in accordance with an embodiment of the present invention.

In this example, system 30 is used to monitor and control industrial control systems in power plants 40 or utility control stations, such as a transmission and switching station of an electric power utility. Power plants 40 typically comprise operational elements, such as elements that make and break power connections. In many actual systems, power plants 40 are unmanned, and the elements are controlled remotely by command transmission stations, such as a control terminal 42, for example. Terminal 42 communicates with power plants 40 via an external packet-data network 32, which may comprise any suitable wired or wireless network, or a combination of such networks, including public networks, such as the Internet. Each power plant 40 is typically designed as a closed, secure facility, protected physically against unauthorized entry.

In a typical scenario, terminal 42 may be part of an electrical sector balancing authority control center. Such control centers routinely exchange information with utilities in the balancing authority's geography using the Inter-Control-Center Communication Protocol (ICCP). Utilities, such as power plants 40, send the balancing authority status information several times per minute, describing the size and status of electric loads, of electric generators, and of electric transmission lines. The balancing authority routinely sends commands back to these utilities again using the ICCP protocol, commands indicating that the utilities should produce more power, or less power, or increase or reduce power flows across certain transmission lines.

Although the pictured example relates, by way of illustration, to an electric power utility, the principles of the present invention are not limited to this particular operating context. Rather, the apparatus and methods that are described below may be applied to utilities of other types (such as gas or water utilities, for instance), as well as in industrial environments and substantially any other application in which tight control is to be exercised over commands that may be input to a protected facility. Power plants 40 are just one example of such a facility, which is presented here for the sake of clarity of explanation. Although certain embodiments of the present invention are described hereinbelow, without limitation, with respect to the elements of system 30, the principles of these embodiments and the techniques that they incorporate may similarly be applied in other operating environments in which a facility is to be protected from undesired data input and unauthorized access.

For example, pumping stations on oil pipelines often communicate with a central SCADA system using the bi-directional Modbus® communications protocol. The SCADA system routinely gathers status information from the pumping station via the Modbus protocol, and occasionally sends commands to the substation, such as "open a valve" or "turn on a pump."

As another example, a chemical plant may routinely send data from plant systems out to corporate applications and users, describing equipment usage, spare parts needs and other status information, while occasionally requiring command inputs from those corporate networks in the form of control recipes. Control recipes describe which chemical products and quantities the business needs the plant to manufacture next in order to meet changing customer orders.

The secure network system 30 includes the external packet-data network 32 and multiple protected packet-data networks 34. The external packet-data network 32 may include computers and other network-connected equipment coordinating activities at the plant, such as maintenance management systems and process historian servers. Each protected packet-data network 34 may be a Distributed Control System (DCS) network including connections to a physical generating unit. Each DCS controls a generating unit consisting of a coal furnace, boiler, steam turbine and generator, by way of example. The DCS may host equipment, such as a monitor 44, that directly monitors and controls the physical process (via input commands to power switching elements), including human-machine interface workstations, alarm servers and programmable logic controllers.

Typically, monitor 44 comprises a controller, which is connected to multiple sensors and actuators, which are distributed throughout the respective power plant 40 and report via a secure internal network to the controller, as described, for example, in the above-mentioned U.S. Pat. No. 7,649,452. The monitors 44 serve as a communication node to output status information collected from the sensors and actuators and to receive commands from the control terminal 42.

As explained earlier, control terminal 42 may communicate with the monitors 44 using a predefined communication protocol, such as ICCP, Modbus, IEC 60870-5 (or other SCADA-compatible protocols), or DNP3 (the Distributed Network Protocol, used between components in process automation systems). Each of these protocols defines certain commands, queries, responses, and status information message formats.

The external packet-data network 32 may include a security server 36, such as a Security Information and Event Management (SIEM) computer system, by way of example only. The Security Information and Event Management system may monitor the security condition of the networks 32, 34, and/or analyze data received from various elements of the network.

The secure network system 30 includes multiple two-way bridges 38 (labeled 38-1 and 38-2), with a respective one of the two way-bridges 38-1, 38-2 connecting the external packet-data network 32 with a respective one of the protected packet-data networks 34-1, 34-2, so as to allow bidirectional communication (for example, by passing raw Ethernet frames and/or IP packets) between the external packet-data network 32 and the protected packet-data networks 34-1, 34-2, for example, to allow bidirectional communication between the control terminal 42 and the monitors 44.

The secure network system 30 includes multiple one-way links 10 (labeled 10-1 and 10-2), with a respective one of the one-way links 10-1, 10-2, unidirectionally connecting a respective one of the protected packet-data networks 34-1, 34-2 to the external packet data network 32. Each one-way link 10 is physically configured to carry signals in one direction from the respective protected packet data network 34 to the external packet data network 32 (e.g., from the monitors 44 to the control terminal 42) and to be incapable of carrying signals in the opposite direction from the external packet data network 32 to the respective protected packet data network 34.

In the absence of a security threat (which may be defined as a security threat above a given level), the respective two-way bridge 38 connects the external packet-data network 32 with the respective protected packet-data network 34 for bidirectional communication as shown in FIG. 2. The IP addresses of the hosts (e.g., the control terminal 42 and the monitors 44) disposed in the protected packet data network 34 and the external packet data network 32 include a same network identification. Therefore, a host in any of the networks 32, 34 may send Ethernet frames and/or Internet Protocol packets to any other host in any of the networks 32, 34. Separate IP address ranges do not need to be assigned to separate networks 32, 34. In the absence of a security threat, the one-way links 10 may be running, but are not actively forwarding data packets from the protected packet-data networks 34 to the external packet-data network 32.

The secure network system 30 includes a network device 46 (such as a switch) disposed in each protected packet data network 34. The respective network device 46-1, 46-2 is configured to receive data packets from a host (e.g., the monitor 44) disposed in the respective protected packet data network 34-1, 34-2 for forwarding to a host (e.g., the control terminal 42) disposed in the external packet-data network 32.

In some embodiments, the respective network device 46-1, 46-2 is configured (for example, via a suitably configured routing table) to mirror the received packets towards the respective two-way bridge 38-1, 38-2 and the respective one-way link 10-1, 10-2. While the two-way bridges 38-1, 38-2 are active (e.g., in the absence of a security threat), the one-way links 10-1, 10-2 are configured to discard mirrored packets. The one-way links 10-1, 10-2 may discard the mirrored packets from their transmit-end 12 or from their receive-end 14 (FIG. 1).

In other embodiments, while the two-way bridges 38-1, 38-2 are active (e.g., in the absence of a security threat) the respective network device 46-1, 46-2 is configured (for example, via a suitably configured routing table) to forward received packets towards the respective two-way bridge 38-1, 38-2 (and not to mirror the received packets to the respective one-way link 10-1, 10-2).

Figure 3:
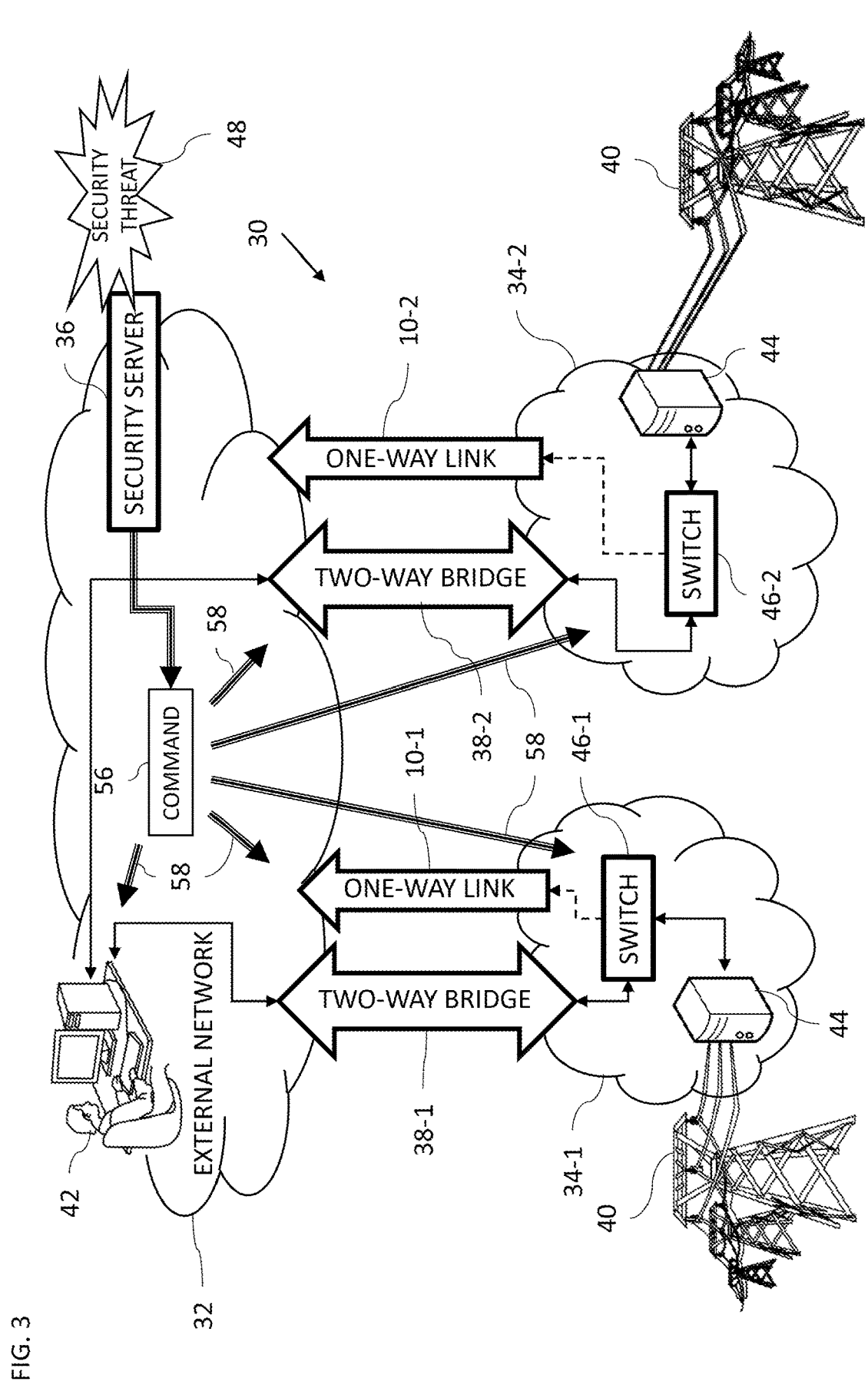
FIG. 3 is a schematic view of the secure network system of FIG. 2 responding to a security threat.
Figure 4:
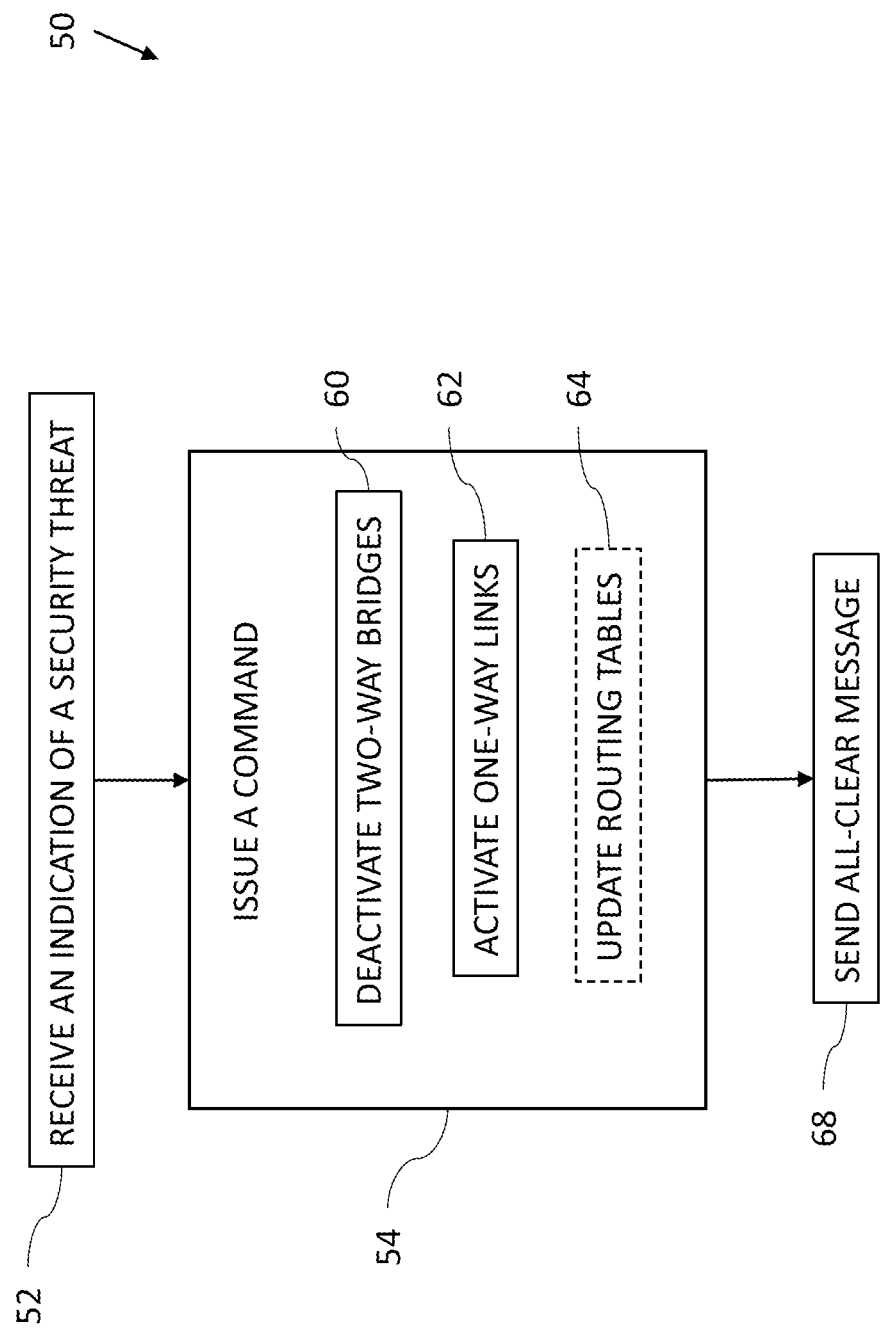
FIG. 4 is a flowchart including steps in a method of operation of a security server in the system of FIG. 3.

Reference is now made to FIG. 3, which is a schematic view of the secure network system 30 of FIG. 2 responding to a security threat (block 48). Reference is also made to FIG. 4, which is a flowchart 50 including steps in a method of operation of a security server 36 in the system 30 of FIG. 3.

The security server 36 is configured to receive (block 52) an indication of a security threat to at least one of the packet data networks 32, 34, for example, from a sensor in at least one of the packet data networks, or from a manual trigger, which may be external to the packet data networks. For example, the security server 36 may detect three anti-virus alerts from three different computers in the external packet-data network 32 in rapid succession and conclude that it is very likely that a worm is spreading throughout the network 32.

In response to the indication(s), the security server 36 is configured to deactivate the two-way bridges 38 and activate the one-way links 10 so as to prevent the protected packet data networks 34 from receiving packets from the external packet data network 32 while allowing forwarding of packets from the protected packet data networks 34 to the external packet data network 32.

The security server 36 may be configured to issue (block 54) a command 56 in response to receiving the indication(s) of the security threat. The command 56 may be sent to multiple nodes, and typically all the nodes, in the networks 32, 34, as indicated by arrows 58, over the networks 32, 34 and/or via an out-of-band connection or connections. The command 56 includes data in order to inform the various elements in the secure network system 30 to deactivate (block 60) the two-way bridges 38 and activate (block 62) the one-way links 10 (e.g., by actuating the one-way links 10 to forward data from the protected packet-data networks 34 to the external packet-data network 32), and optionally update (block 64) routing tables (for example, to instruct the respective network device 46-1, 46-2 to cease forwarding packets to the respective two-way bridge 38-1, 38-2, and commence forwarding packets to the respective one-way link 10-1, 10-2).

Disabling the two-way bridges 38 may include a physical measure such as activation of a mechanical relay, which may require manual intervention to reactivate the two-way bridges 38 at a future time when the security situation has normalized in order to ensure that the two-way bridges 38 are not reactivated maliciously using a software attack. In some embodiments, the disablement of the two-way bridges 38 may include an automatic timeout (e.g., 2 hours or any suitable time-period) so that if no new security alert is issued, the two-way bridges 38 are automatically reactivated after expiration of the timeout.

Figure 5:
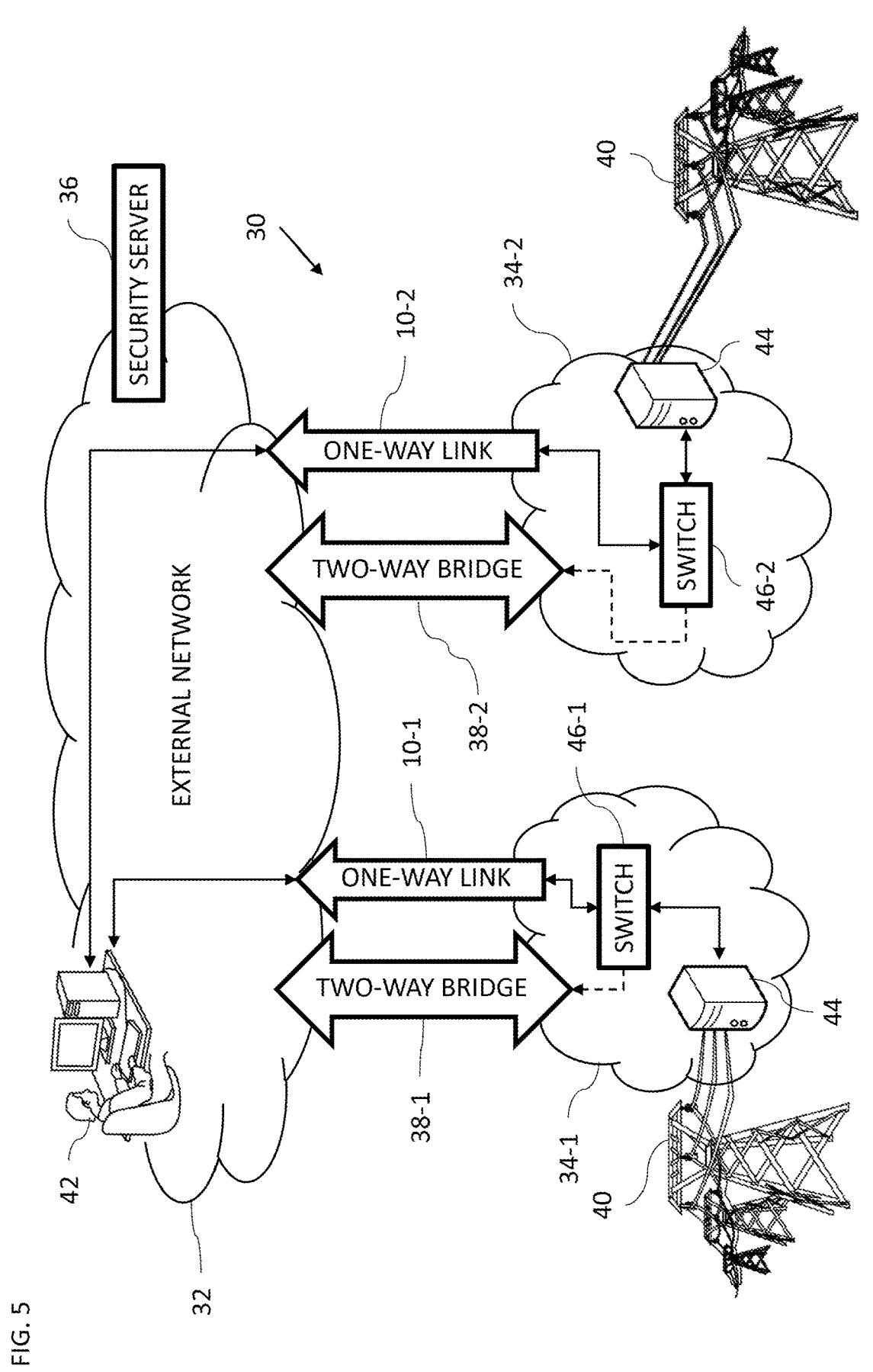
FIG. 5 is a schematic view of the secure network system of FIG. 2 operating in a protected security mode.

Reference is now made to FIG. 5, which is a schematic view of the secure network system 30 of FIG. 2 operating in a protected security mode.

The various elements of the secure network system 30 receive the command 56 (FIG. 3) and act on the command 56. For example, Windows and Linux hosts on the network may disable all remote file sharing services and remote access services such as Remote Desktop and Virtual Network Commuting (VNC). When the two-way bridges 38 receive the command 56 they disable the bridging function between networks 32, 34, as shown in FIG. 5.

When the one-way links 10 receive the command 56 (FIG. 3), the one-way links 10 activate, and emulate clients and servers on either side of the one-way links 10, thereby emulating essential cross-network communications components (e.g., allowing correct operation of the generating units and continued operation of the plants 40).

The transmit proxy 16 (FIG. 1) and the receive proxy 22 (FIG. 1) at the transmit-end 12 (FIG. 1) and the receive-end 14 (FIG. 1), respectively, emulate hosts in the protected and external packet networks 32, 34, and adopt Internet Protocol (IP) addresses of the hosts so as to allow the hosts in the protected and external packet networks 32, 34 to continue to use the IP addresses in network communications over the one-way-links 10. In this way, no routing changes are required in the network including the external packet-data network 32 and the protected packet-data networks 34. In this state, information can flow from more-critical components, such as the monitor 44 to less-sensitive networks, but no information or attacks can flow back into more-sensitive networks (such as the protected packet-data networks 34).

In embodiments, where the respective network device 46-1, 46-2 mirrors packets to the respective one-way link 10-1, 10-2 (even when the respective two-way bridge 38-1, 38-2 is active), the respective one-way link 10-1, 10-2 is configured to forward the mirrored packets to the control terminal 42 (or another host) in the external packet-data network 32 responsively to receiving the issued command 56 (FIG. 3) from the security server 36. The one-way links 10 may be activated according to the transmit-end 12 (FIG. 1) and/or the receive-end 14 (FIG. 1) receiving the command 56 from the security server 36. If the transmit-end 12 forwards mirrored packets that are then discarded by the receive-end 14 when the one-way link 10 is non-activated, the receive-end 14 is configured to forward mirrored packets to the control terminal 42 (or another host) responsively to receiving the issued command 56 from the security server 36. If the transmit-end 12 discards mirrored packets when the one-way link 10 is non-activated, the transmit-end 12 and the receive-end 14 are configured to forward the mirrored packets to the control terminal 42 (or another host) responsively to receiving the issued command 56 from the security server 36.

In other embodiments, where the network devices 46 do not mirror packets to the two-way bridges 38 and the one-way links 10, the respective network device 46-1, 46-2 is configured (for example, using an updated routing table) to forward received packets towards the respective one-way link 10-1, 10-2 responsively to receiving the issued command 56 (FIG. 3) (which may include an updated routing table) from the security server 36.

Reference is again made to FIG. 4. At a future time, when the security server 36 determines that the security situation has normalized, the security server 36 sends (block 68) an "all clear" message to various network nodes and components, enabling them to return to normal operations. In this example, that message would only reach the external packet-data network 32, because in the segmented network state, there is no way for the "all clear" message to reach the other networks 34. In this example, human intervention is required to press a button on the two-way bridge 38 front panels, or using another suitable measure, enabling them to resume normal operations. In this example, messages may need to be sent multiple times from the security server 36, in coordination with human intervention at the two-way bridges 38, to enable the network to resume normal operations. Such coordination and repetition may not be needed in other network designs.

Figure 6:
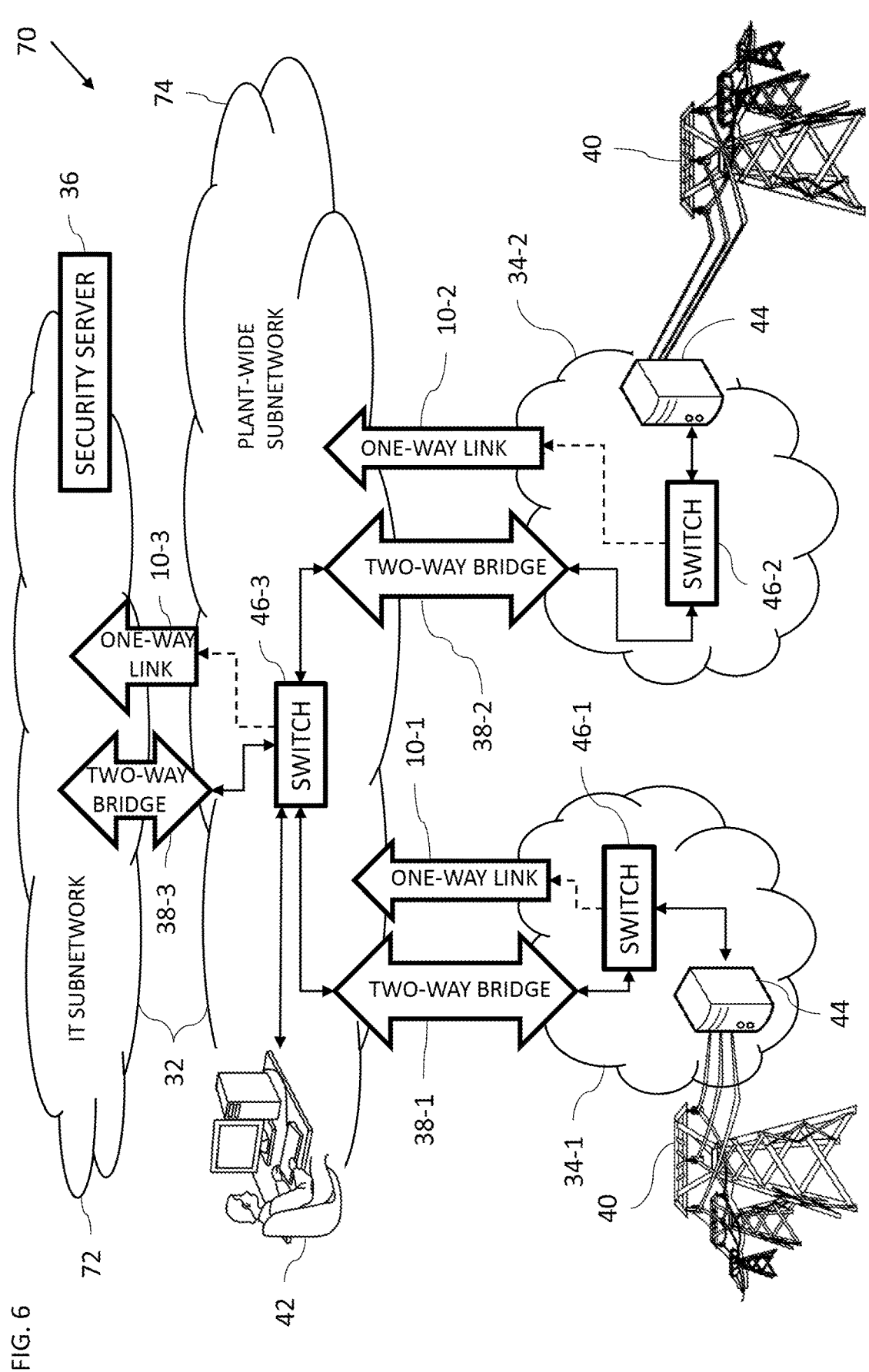
FIG. 6 is a schematic view of a secure network system constructed and operative in accordance with an alternative embodiment of the present invention.

Reference is now made to FIG. 6, which is a schematic view of a secure network system 70 constructed and operative in accordance with an alternative embodiment of the present invention. The secure network system 70 is substantially the same as the secure network system 30 of FIG. 2, except that in the secure network system 70, the external packet-data network 32 includes two subnetworks, for example, an IT subnetwork 72 and a plant-wide subnetwork 74, connected by a two-way bridge 38-3 and a one-way link 10-3, described in more detail below. For the sake of consistency similar references numerals as used with reference to the secure network system 30 are now used with reference to the secure network system 70.

The two-way bridge 38-3 connects the IT subnetwork 72 with the plant-wide subnetwork 74, so as to allow bidirectional communication between the IT subnetwork 72 and the plant-wide subnetwork 74.

The one-way link 10-3 unidirectionally connects the plant-wide subnetwork 74 to the IT subnetwork 72, and is configured to carry signals in one direction from the plant-wide subnetwork 74 to the IT subnetwork 72 and to be incapable of carrying signals in the opposite direction from the IT subnetwork 72 to the plant-wide subnetwork 74.

The two-way bridges 38-1, 38-2 bidirectionally connect protected packet-data networks 34-1, 34-2, respectively, with the plant-wide subnetwork 74. The one-way links 10-1, 10-2, unidirectionally connect the protected packet data networks 34-1, 34-2, respectively, to the plant-wide subnetwork 74.

The IT subnetwork 72 may include computers and other network-connected equipment used to run the enterprise, including printers, workstations and financial systems. The security server 36 is disposed in the IT subnetwork 72.

The plant-wide subnetwork 74 may include computers and other network-connected equipment coordinating activities at the power plants 40, such as maintenance management systems and process historian servers. The control terminal 42 is disposed in the plant-wide subnetwork 74.

In the absence of a security threat (which may be defined as a security threat above a given level), the respective two-way bridges 38 connect the IT subnetwork 72, the plant-wide subnetwork 74 and the protected packet-data networks 34 together for bidirectional communication as shown in FIG. 6. The IP addresses of the hosts (e.g., the control terminal 42, the monitors 44, and the security server 36) disposed in the networks 72, 74, 34, include a same network identification. Therefore, a host in any of the networks 72, 74, 34 may send Ethernet frames and/or Internet Protocol packets to any other host in any of the networks 72, 74, 34, and separate IP address ranges do not need to be assigned to separate networks 72, 74, 34. In the absence of a security threat, the one-way links 10 may be running, but are not actively forwarding data packets from the protected packet-data networks 34 to the plant-wide subnetwork 74, or from the plant-wide subnetwork 74 to the IT subnetwork 72.

The plant-wide subnetwork 74 includes a network device 46-3 (such as a switch) disposed in the plant-wide subnetwork 74. The network device 46-3 is configured to receive data packets from a host (e.g., the monitor 44) disposed in the respective protected packet data network 34-1, 34-2 for forwarding to a host (e.g., the control terminal 42) disposed in the plant-wide subnetwork 74 or to a host (e.g., the security server 36) disposed in the IT subnetwork 72.

In some embodiments, the respective network device 46-1, 46-2, 46-3 is configured (for example, via a suitably configured routing table) to mirror the received packets towards the respective two-way bridge 38-1, 38-2, 38-3 and the respective one-way link 10-1, 10-2, 10-3. While the two-way bridges 38-1, 38-2, 38-3 are active (e.g., in the absence of a security threat), the one-way links 10-1, 10-2, 10-3 are configured to discard mirrored packets. The one-way links 10-1, 10-2 10-3 may discard the mirrored packets from their transmit-end 12 or from their receive-end 14 (FIG. 1).

In other embodiments, while the two-way bridges 38-1, 38-2, 38-3 are active (e.g., in the absence of a security threat) the respective network device 46-1, 46-2, 46-3 is configured (for example, via a suitably configured routing table) to forward received packets towards the respective two-way bridge 38-1, 38-2, 38-3 (and not to mirror the received packets to the respective one-way link 10-1, 10-2, 10-3).

Figure 7:
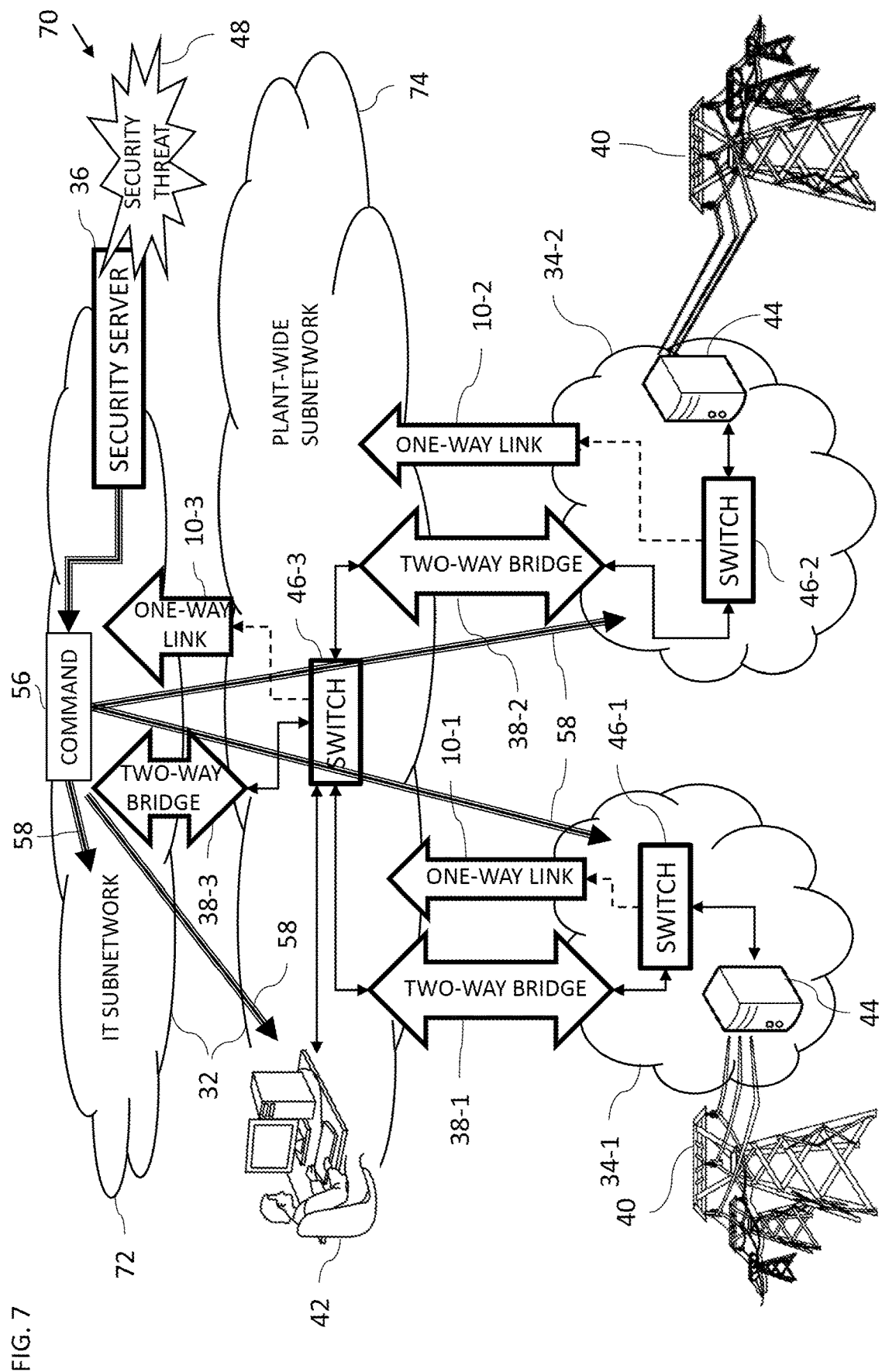
FIG. 7 is a schematic view of the secure network system of FIG. 6 responding to a security threat.

Reference is now made to FIG. 7, which is a schematic view of the secure network system 70 of FIG. 6 responding to security threat 48.

The security server 36 is configured to receive an indication of a security threat to at least one of the packet data networks 72, 74, 34, for example, from a sensor in at least one of the packet data networks, or from a manual trigger, which may be external to the packet data networks. For example, the security server 36 may detect three anti-virus alerts from three different computers in the IT subnetwork 72 in rapid succession and conclude that it is very likely that a worm is spreading throughout the IT subnetwork 72.

In response to the indication(s), the security server 36 is configured to deactivate the two-way bridges 38 and activate the one-way links 10 so as to prevent the protected packet data networks 34 from receiving packets from the IT subnetwork 72 and the plant-wide subnetwork 74, and to prevent the plant-wide subnetwork 74 from receiving packets from the IT subnetwork 72, while allowing forwarding of packets from the protected packet data networks 34 to the plant-wide subnetwork 74 and the IT subnetwork 72, and from the plant-wide subnetwork 74 to the IT subnetwork 72.

The security server 36 may be configured to issue command 56 in response to receiving the indication(s) of the security threat. The command 56 may be sent to multiple nodes, and typically all the nodes, in the networks 72, 74, 34, as indicated by arrows 58, over the networks 72, 74, 34 and/or via an out-of-band connection or connections. The command 56 includes data in order to inform the various elements in the secure network system 70 to deactivate the two-way bridges 38 and activate the one-way links 10 (e.g., by actuating the one-way links 10 to forward data from the protected packet-data networks 34 to the external packet-data network 32 and from the plant-wide subnetwork 74 to the IT subnetwork 72), and optionally update routing tables (for example, to instruct the respective network device 46-1, 46-2, 46-3 to cease forwarding packets to the respective two-way bridge 38-1, 38-2, 38-3 and commence forwarding packets to the respective one-way link 10-1, 10-2, 10-3).

Figure 8:
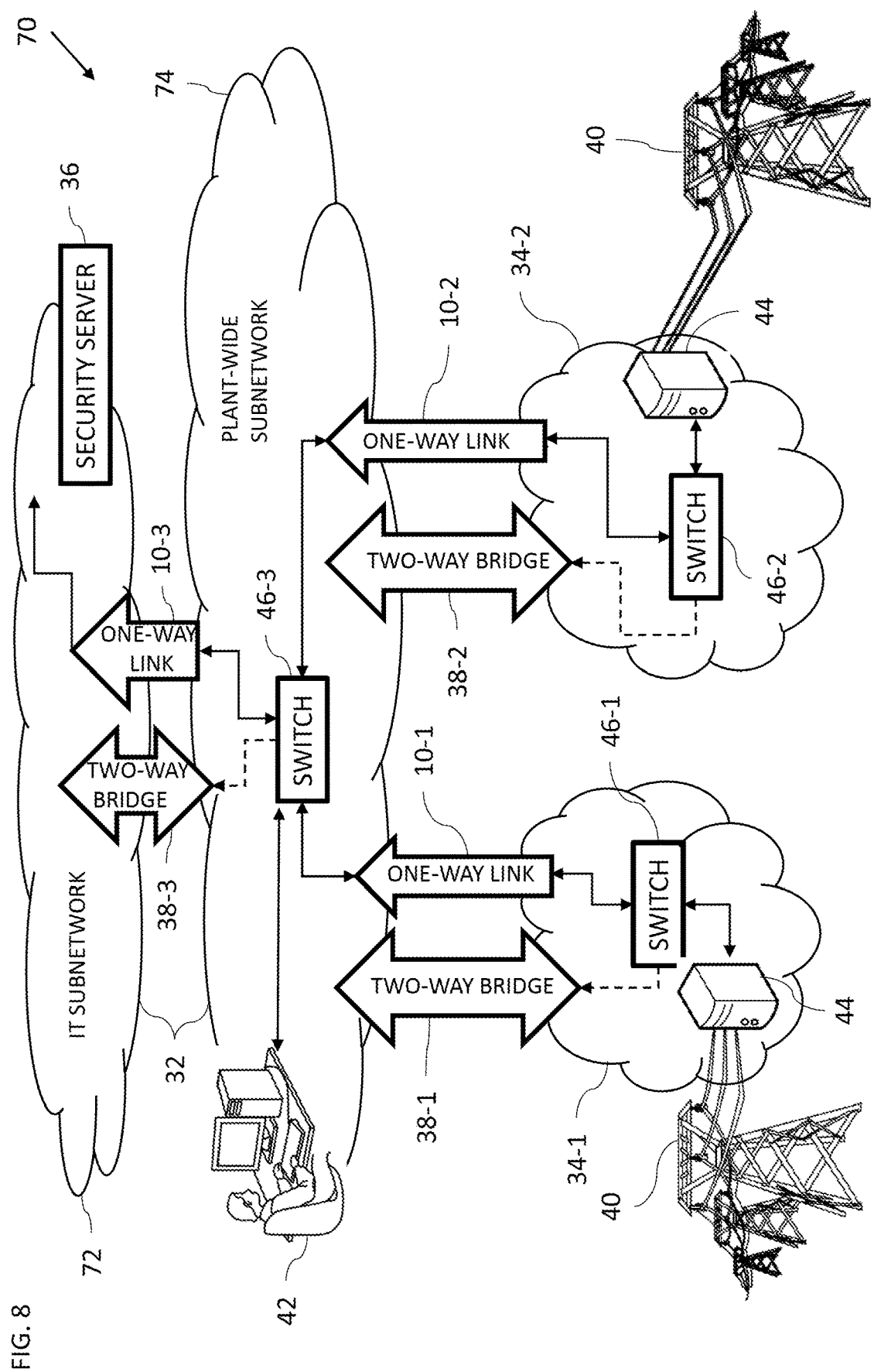
FIG. 8 is a schematic view of the secure network system of FIG. 6 operating in a protected security mode.

Reference is now made to FIG. 8, which is a schematic view of the secure network system 70 of FIG. 6 operating in a protected security mode.

The various elements of the secure network system 70 receive the command 56 (FIG. 7) and act on the command 56. For example, Windows and Linux hosts on the network may disable all remote file sharing services and remote access services such as Remote Desktop and VNC. When the two-way bridges 38 receive the command 56 they disable the bridging function between networks 72, 74, 34, as shown in FIG. 8.

When the one-way links 10 receive the command 56 (FIG. 3), the one-way links 10 activate, and emulate clients and servers on either side of the one-way links 10, thereby emulating essential cross-network communications components (e.g., allowing correct operation of the generating units and continued operation of the plants 40).

The transmit proxy 16 (FIG. 1) and the receive proxy 22 (FIG. 1), at the transmit-end 12 (FIG. 1) and the receive-end 14 (FIG. 1), respectively, emulate hosts in the networks 72, 74, 34, and adopt Internet Protocol (IP) addresses of the hosts so as to allow the hosts in the networks 72, 74, 34 to continue to use the IP addresses in network communications over the one-way-links 10. In this way, no routing changes are required in the network including the IT subnetwork 72, the plant-wide subnetwork 74, and the protected packet-data networks 34. In this state, information can flow from more-critical components, such as the monitor 44 to less-sensitive networks, but no information or attacks can flow back into more-sensitive networks.

In embodiments, where the respective network device 46-1, 46-2, 46-3 mirrors packets to the respective one-way link 10-1, 10-2, 10-3, the respective one-way link 10-1, 10-2, 10-3 is configured to forward the mirrored packets to a host in the IT subnetwork 72 or the plant-wide subnetwork 74 responsively to receiving the issued command 56 from the security server 36. The one-way links 10 may be activated according to the transmit-end 12 (FIG. 1) and/or the receive-end 14 (FIG. 1) receiving the command 56 from the security server 36. If the transmit-end 12 forwards mirrored packets that are discarded by the receive-end 14 when the one-way link 10 is non-activated, the receive-end 14 is configured to forward mirrored packets to the control terminal 42 (or another host) responsively to receiving the issued command 56 from the security server 36. If the transmit-end 12 discards the mirrored packets when the one-way link 10 is non-activated, the transmit-end 12 and the receive-end 14 are configured to forward the mirrored packets to the control terminal 42 (or another host) responsively to receiving the issued command 56 from the security server 36.

In other embodiments, where the network devices 46 do not mirror packets to the two-way bridges 38 and the one-way links 10, the respective network device 46-1, 46-2, 46-3 is configured (for example, using an updated routing table) to forward received packets towards the respective one-way link 10-1, 10-2, 10-3 responsively to receiving the issued command 56 (FIG. 3) (which may include an updated routing table) from the security server 36.

At a future time, when the security server 36 determines that the security situation has normalized, the security server 36 sends an "all clear" message to various network nodes and components, enabling them to return to normal operations. In this example, that message would only reach the external IT subnetwork 72, because in the segmented network state, there is no way for the "all clear" message to reach the other networks 74, 34. In this example, human intervention is required to press a button on the two-way bridge 38 front panels, or another suitable measure, enabling them to resume normal operations. In this example, messages may need to be sent multiple times from the security server 36, in coordination with human intervention at the two-way bridges 38, to enable the network to resume normal operations. Such coordination and repetition may not be needed in other network designs.

In practice, some or all of the functions of the secure network systems 30, 70 may be combined in a single physical component or, alternatively, implemented using multiple physical components. These physical components may comprise hard-wired or programmable devices, or a combination of the two. In some embodiments, at least some of the functions may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

The software components of the present invention may, if desired, be implemented in ROM (read only memory) form. The software components may, generally, be implemented in hardware, if desired, using conventional techniques. The software components may be instantiated, for example: as a computer program product or on a tangible medium. In some cases, it may be possible to instantiate the software components as a signal interpretable by an appropriate computer, although such an instantiation may be excluded in certain embodiments of the present invention.

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The embodiments described above are cited by way of example, and the present invention is not limited by what has been particularly shown and described hereinabove. Rather the scope of the invention includes both combinations and subcombinations of the various features described hereinabove, as well as variations and modifications thereof which would occur to persons skilled in the art upon reading the foregoing description and which are not disclosed in the prior art.

What is claimed is:

1. A secure network system comprising:
    a two-way bridge connecting a protected packet data network with an external packet data network so as to allow bidirectional communication between the protected packet data network and the external packet data network;
    a one-way link unidirectionally connecting the protected packet data network to the external packet data network and physically configured to carry signals in one direction from the protected packet data network to the external packet data network and to be incapable of carrying signals in the opposite direction from the external packet data network to the protected packet data network; and
    a security server configured:
        to receive an indication of a security threat to at least one of: the protected packet data network; or the external packet data network; and
        in response to the indication, issue a command to deactivate the two-way bridge and activate the one-way link so as to prevent the protected packet data network from receiving packets from the external packet data network while allowing forwarding of packets from the protected packet data network to the external packet data network.

2. The system according to claim 1, wherein the one-way link comprises a hardware-enforced unidirectional channel.

3. The system according to claim 1, further comprising a network device disposed in the protected packet data network, and configured to:
    receive data packets from a first host disposed in the protected packet data network for forwarding to a second host disposed in the external packet data network; and
    mirror the received packets towards the two-way bridge and the one-way link.

4. The system according to claim 1, further comprising a network device disposed in the protected packet data network, and configured to: receive data packets from a first host disposed in the protected packet data network for forwarding to a second host disposed in the external packet data network; forward the received packets towards the two-way bridge while the two-way bridge is active; and forward the received packets towards the one-way link responsively to receiving the issued command from the security server.

5. The system according to claim 1, wherein the one-way link includes a transmit-end and a receive-end, the one-way link including a proxy at both the transmit-end and the receive-end emulating hosts in the protected and external packet networks, and adopting Internet Protocol (IP) addresses of the hosts so as to allow the hosts in the protected and external packet networks to use the IP addresses in network communications over the one-way-link.

6. A secure network method, comprising:
  connecting a protected packet data network with an external packet data network using a two-way bridge so as to allow bidirectional communication between the protected packet data network and external packet data network;
  unidirectionally connecting the protected packet data network to the external packet data network using a one-way link which is physically configured to carry signals in one direction from the protected packet data network to the external packet data network and to be incapable of carrying signals in the opposite direction from the external packet data network to the protected packet data network;
  receiving an indication of a security threat to at least one of: the protected packet data network; or the external packet data network; and
  in response to the indication, issuing a command to deactivate the two-way bridge and activate the one-way link so as to prevent the protected packet data network from receiving packets from the external packet data network while allowing forwarding of packets from the protected packet data network to the external packet data network.

7. The method according to claim 6, wherein the one-way link comprises a hardware-enforced unidirectional channel.

8. The method according to claim 6, further comprising:
  receiving data packets, by a network device disposed in the protected packet data network, from a first host disposed in the protected packet data network for forwarding to a second host disposed in the external packet data network; and
  mirroring, by the network device, the received packets towards the two-way bridge and the one-way link.

9. The method according to claim 6, further comprising:
  receiving data packets, by a network device disposed in the protected packet data network, from a first host disposed in the protected packet data network for forwarding to a second host disposed in the external packet data network;
  forwarding the received packets, by the network device, towards the two-way bridge while the two-way bridge is active; and
  forwarding the received packets, by the network device, towards the one-way link responsively to receiving the issued command.

10. The method according to claim 6, further comprising emulating, at both a transmit-end and a receive-end of the one-way link, hosts in the protected and external packet networks, and adopting Internet Protocol (IP) addresses of the hosts so as to allow the hosts in the protected and external packet networks to use the IP addresses in network communications over the one-way-link.

* * * * *